United States Patent
Vesterinen et al.

(10) Patent No.: US 9,167,413 B2
(45) Date of Patent: Oct. 20, 2015

(54) LOCAL BREAKOUT WITH PARAMETER ACCESS SERVICE

(75) Inventors: Seppo Ilmari Vesterinen, Oulunsalo (FI); Wolfgang Hahn, Bergfelde (DE); Petri Olavi Jappila, Helsinki (FI); Joanna Pauliina Jokinen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 667 days.

(21) Appl. No.: 13/266,332

(22) PCT Filed: May 5, 2009

(86) PCT No.: PCT/EP2009/003220
§ 371 (c)(1),
(2), (4) Date: Oct. 26, 2011

(87) PCT Pub. No.: WO2010/127683
PCT Pub. Date: Nov. 11, 2010

(65) Prior Publication Data
US 2012/0046058 A1 Feb. 23, 2012

(51) Int. Cl.
*H04B 7/00* (2006.01)
*H04W 8/08* (2009.01)
*H04W 88/16* (2009.01)
(Continued)

(52) U.S. Cl.
CPC ............ *H04W 8/082* (2013.01); *H04W 84/045* (2013.01); *H04W 88/16* (2013.01); *H04W 92/24* (2013.01)

(58) Field of Classification Search
CPC . H04W 84/045; H04W 88/16; H04W 76/022; H04W 4/00; H04W 28/0268; H04W 48/16

USPC ........ 455/509, 50, 517, 511, 445, 507, 550.1, 455/432.1–432.3, 433, 436–444, 455/414.1–414.4, 403, 426.1, 426.2, 466, 455/435.1–435.3, 450, 453, 561, 552.1, 455/551; 370/253, 328, 329, 310.343, 370/352–359, 401

See application file for complete search history.

(56) References Cited

U.S. PATENT DOCUMENTS

| 8,457,636 | B2 * | 6/2013 | Liu et al. ...................... 455/436 |
| 8,467,782 | B1 * | 6/2013 | Faccin ......................... 455/432.1 |
| 8,483,686 | B2 * | 7/2013 | Zhang et al. ............... 455/435.1 |

(Continued)

FOREIGN PATENT DOCUMENTS

| WO | 2008/125729 | 10/2008 |
| WO | 2010/102652 | 9/2010 |

OTHER PUBLICATIONS

International Search Report and Written Opinion corresponding to International Application No. PCT/EP2009/003220 dated Apr. 8, 2010.

(Continued)

*Primary Examiner* — Keith Ferguson
(74) *Attorney, Agent, or Firm* — Squire Patton Boggs (US) LLP

(57) ABSTRACT

The present invention relates to a method, apparatus, and computer program product for providing access via a cellular access network to a packet data net-work, wherein control plane functions of a gateway device of a core net-work are emulated to the core network, and the emulated control plane functions are used to provide to the core network a set of parameters for local breakout.

21 Claims, 12 Drawing Sheets

(51) Int. Cl.
*H04W 84/04* (2009.01)
*H04W 92/24* (2009.01)

(56) References Cited

U.S. PATENT DOCUMENTS

| | | | | |
|---|---|---|---|---|
| 2007/0232301 | A1* | 10/2007 | Kueh | 455/433 |
| 2008/0285492 | A1 | 11/2008 | Vesterinen | |
| 2010/0272031 | A1* | 10/2010 | Grayson et al. | 370/329 |
| 2010/0284299 | A1* | 11/2010 | Bi et al. | 370/253 |
| 2013/0107702 | A1* | 5/2013 | Gupta et al. | 370/230 |
| 2013/0235801 | A1* | 9/2013 | Parsons et al. | 370/328 |

OTHER PUBLICATIONS

3GPP TS 23.060 V9.0.0 (Mar. 2009) Technical Specification 3rd Generation Partnership Project; Technical Specification Group Services and System Aspects; General Packet Radio Service (GPRS); Service description; Stage 2 (Release 9), pp. 1-275.
3GPP TSG SA WG2 Meeting #69, Nov. 17-21, 2008, Miami, Florida, USA, TD S2-087493, Source: Qualcomm Europe, Title: Local IP access for EHNB, Document for Approval, Agenda Item:7.6, Work Item / Release:EHNB / Release 9, 5 pages.
3GPP TS 22.220 V9.0.0 (Mar. 2009) Technical Specification 3rd Generation Partnership Project; Technical Specification Group Services and System Aspects; Service requirements for Home NodeBs and Home eNodeBs (Release 9), pp. 1-22.
3GPP TR 23.830 V0.4.1 (Apr. 2009) Technical Report 3rd Generation Partnership Project; Technical Specification Group Services and System Aspects; Architecture aspects of Home NodeB and Home eNodeB (Release 9), pp. 1-53.
3GPP TS 23.401 V8.5.0 (Mar. 2009) Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 8), pp. 1-223.
3GPP TS 23.401 V8.4.0 (Dec. 2008) Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 8), pp. 1-219.
3GPP Draft; LTE Local Breakout for Home eNB (3GPP TSG•RAN WG3 Meeting #62), XP050324423 [retrieved on Nov. 5, 2008] the whole document, R3-083198, 4 pages.
3GPP TSG SA WG2 Meeting #72 Mar. 30,-Apr. 3, 2009, Hangzhou, China, TD S2-092949, Converged architecture principles and open architectural issues for Local IP access, Agenda Item:7.4.6, Work Item / Release:EHNB / Release 9, 2 pages.
Vodafone Group: "G HomeNB Architecture Discussion", 3GPP Draft; R3-080775, 3GPP TSG RAN3 #59bis, Mar. 31,-Apr. 4, 2008, Retrieved Mar. 27, 2008, XP050163979, pp. 1-8.
China Mobile et al, "Single IP Local Breakout for H(e)NB", 3GPP Draft, TD S2-092881, 3GPP TSG SA WG2 Meeting #72, Apr. 2, 2009, XP050346033, pp. 1-3.
3GPP TS 23.402 V8.5.0 (Mar. 2009) Technical Specification, 3rd Generation Partnership Project; Technical Specification Group Services and System Aspects; Architecture enhancements for non-3GPP accesses (Release 8), pp. 1-196.
3GPP TSG-RAN WG3 Meeting #56, R3-071011, "Requirements on 3G Home NodeB", Nokia Siemens Network, Kobe, Japan, May 7-11, 2007, 2 pages.
3GPP TSG-RAN WG3 Meeting #56, R3-071162, "Issues to be Discussed on 3G Home NodeB", Kobe, Japan, May 7-11, 2007, 7 pages.
3GPP TR R3.020 V0.9.0 (Sep. 2008) Technical Report, 3rd Generation Partnership Project; Technical Specification Group Radio Access Network; Home (e)NodeB; Network aspects (Release 8), pp. 1-67.

* cited by examiner

LOCAL BREAKOUT WITH PARAMETER ACCESS SERVICE

FIELD OF THE INVENTION

The present invention relates to a method, apparatus and computer program product for providing a network system which enables access via a radio access network to a packet-switched network, such as—but not limited to—Universal Mobile Communications System (UMTS) or Long Term Evolution (LTE) or Local Area Network (LAN) networks.

BACKGROUND OF THE INVENTION

As an enhancement to conventional macro enhanced NodeBs (macro eNBs) for bigger macro cells, Home base stations, Home NodeBs, Femto eNodeBs (eNBs) or any type of home access device (in the following referred to as "HNB") have become a widely discussed topic within $3^{rd}$ Generation Partnership Project (3GPP) as well as in the operator and manufacturer community. When deployed in homes and offices, HNBs allow subscribers to use their existing handsets—in a building—with significant improved coverage and increased broadband wireless performance. Moreover, Internet Protocol (IP) based architecture allows deployment and management in virtually any environment with broadband Internet service.

In current standardization activities, deployment scenarios involving Femto Base Stations in the context of 3G and LTE is attracting great interest from manufacturers and operators. The current status in 3GPP standardization activities is that HNB deployment has been acknowledged by several working groups and official documents have been drafted to capture the requirements concerning such HNB deployments.

In 3GPP specification TS 22.220, local IP access in home based networks has been described, wherein local IP breakout (LBO) from HNB to home based networks or to the Internet has been suggested in addition to ordinary IP based services via the operator's core network. Allowing for local breakout (also referred to as "route optimization") of IP traffic could both shorten the end-to-end route and reduce the load on relatively expensive IP backbones (which inherently provides a high quality of service).

Local IP access is intended to differentiate user's local IP traffic in the HNB so that local IP traffic to/from IP devices connected to home based networks is forwarded on the shortest path so that it does not transit outside the home based network (i.e. remains Intranet traffic). Moreover, local IP access traffic to the Internet does not necessarily transit across the operator's evolved packet core (EPC), i.e., the Internet traffic can be forwarded to and received from the Internet via a gateway local to a base station without having to transit through the operator's core nodes.

The current 3GPP specifications and contributions suggest integrating a General Packet Radio Services (GPRS) Gateway Support Node (GGSN) or another kind of gateway function into the HNB for implementing local breakout to home based networks or to the Internet. However, implementing a local gateway for local IP access into the HNB requires incorporation of lots of gateway functions (such as tunneling, charging, Home Agent etc.), so that complexity and processing load is increased and an agreed split between radio access network (RAN) and core net-work is violated. Furthermore, gateway devices are modelled as IP routers that perform IP lookup for routing user traffic to/from 3GPP specified bearer services. Thus, if local breakout was done at a GGSN-like IP router function in the HNB, this would lead to the disadvantage that every kind of inter HNB handover will result in a change of GGSN and thus require use of a cell reselection procedure. In other words, modelling a local gateway functionality within the HNB as an IP router would limit IP mobility and session continuation to work just when the served terminal device (e.g. user equipment (UE)) is connected to the current HNB. This would lead to a severe limitation e.g. in local area scenarios like in an office or campus where local IP access could be served through a multiple cells or base stations in the local area.

Moreover, the local gateway functionality within the HNB requires termination of additional core network (CN) interfaces in the HNB. This will lead to an undesired increase in complexity of HNB implementation. In addition, such additional terminations of CN interfaces in local IP access devices may harm implementation of local IP mobility in future local area scenarios by necessitating gateway relocation procedures on every inter access device handover in case of terminal movements within a local service area (e.g. office or campus LAN with multiple local area access devices (e.g. (base) stations).

As another issue, HNBs are no high availability nodes and may thus suffer from power failures or broadband access breaks. End users may switch them off anytime for energy saving purposes while they are not at home. This would add complexity to network exception case handling if CN interfaces were terminated in co-located gateways at such HNBs.

An even further issue is that according to the current standard a terminal device shall have only one serving gateway as a mobility anchor to the EPC at a time. In case a real local gateway is provided and controlled via a CN interface, there would be two gateways for each terminal, i.e., one in the EPC as usual and another co-located with the HNB, which is not desirable.

The WO2008/125729A1 discloses a method, radio system, mobile terminal and base station for providing local breakout or local IP access, wherein local access session or service management is performed at EUTRAN (Evolved Universal Terrestrial Radio Access Network) level when the need for core network interfaces to control the local gateway functionality can be eliminated. However, radio resource control (RRC) and non-access stratum (NAS) interfaces still need to be modified accordingly, which might lead to support or compatibility related problems.

SUMMARY

Among others, objects underlying the present invention are to provide a simplified local breakout control with minimum modifications of existing CN interfaces and/or without any modifications of core network functionalities and procedures and/or with full transparency to the terminal side.

These objects are achieved by an apparatus comprising local service providing means for emulating, to a core network, control plane functions of a gateway device of said core network, and for providing to said core network a set of parameters for local breakout.

Furthermore, the above objects are achieved by a method comprising:
  emulating, to a core network, control plane functions of a gateway device of said core network; and
  using said emulated control plane functions to provide to said core network a set of parameters for local breakout.

Additionally, the above objects are achieved by a computer program product comprising code means for producing the above method steps when run on a computing device. This computer program product may be stored on a computer readable medium or provided for download from a network, such as the Internet.

The above apparatus may be implemented a software controlled processing device, as a discrete hardware circuit, as an integrated circuit or single or multi chip device, or as a chip module, which may be provided in a network entity.

Accordingly, instead of terminating core network interfaces (like Gn, Gx, S5 or S11) in the access node or device (e.g. HNB) for controlling the co-located local gateway node or device (e.g. local GGSN or local S/-PGW) provided in this access device, a simple parameter access service function or unit for local IP access or local breakout can be provided to the core network (e.g. EPC). This parameter access service function or unit emulates to the core network (e.g. MME, SGSN or the like) the functions of the gateway device in order to get the required configuration by using ordinary elementary procedures over an emulated control interface (e.g. S11 and/or S5 interfaces or Gn interface for third generation (3G) networks).

Thereby, a pre-defined set of parameter (e.g. local IP access parameters or LBO parameters) can be pre-provisioned to the local parameter access service function or unit that returns these to the core network upon reception of predetermined messages (e.g. standard S11 Create Default Bearer Request procedure and/or S11 Update Bearer Request procedure).

It is noted that the local service providing means can be arranged at any place where they can be accessed over IP from the core network (e.g. MME), for example in or at the "real" S-/P-G, in or at the MME as a "local host", in or at a HNB gateway, in or at a simple personal computer (PC), and/or in or at the HNB or any other kind of access device.

In this way, the standard MME does not need to be modified as it executes the related S11 elementary procedures as usual. The local service providing means emulate the control-plane functions of the gateway device, but it is not required to support any user-plane processing functions as in the local IP access (or LBO).

This can happen via the local gateway function in the access device (e.g. HNB) that performs simple IP traffic bridging between the local area network and the EPS (Evolved packet System) Bearer service over the radio interface.

The local IP access traffic can break-out directly from the access device (e.g. HNB) to the local area network (e.g. home LAN, corporate Intranet, etc.) or to the Internet without any IP tunneling (e.g. GTP, GRE) i.e. it does not pass any user-plane gateway node located in the core network. Thus, due to the provision of the proposed local service providing means, user-plane processing functions can be omitted.

Additionally, standard core network nodes (e.g. MME) can be used without any modifications for supporting local IP access services (i.e. local breakout) directly via the access devices to local area networks.

The gateway device of the core network may be a gateway support node of a GPRS network, a S-GW, or a P-GW.

The local service providing means may be adapted to use ordinary elementary procedures over at least one control interface of the core network.

The at least one control interface may comprise at least one of an S5 interface, an S11 interface and a Gn interface of a GPRS or UMTS network.

More specifically, the set of parameters comprises at least one of a packet data network type requested by a terminal device requesting the local breakout, a packet data network address of the terminal device, a serving gateway address, a serving gateway tunnel endpoint identifier for a user plane, a serving gateway tunnel endpoint identifier for a control plane, a bearer identity for the local breakout, at least one packet data network gateway address and tunnel endpoint identifier or generic routing encapsulation (GRE) key for uplink traffic, an address allocation preference, a prohibit payload compression parameter, and an aggregate maximum bitrate for local breakout bearers.

According to a first aspect, the apparatus may be provided in or at a gateway device (e.g. S-GW), wherein the gateway device may be arranged to provide access from the core network to an external network for the local breakout. This first aspect also solves the problem associated with multiple serving gateways allocated to a terminal device in the core network. Now the very same serving gateway can be used both for ordinary core network bearer services (e.g. EPS bearer services) and local IP access services in case the proposed service providing means will be placed into the current serving gateway of a concerned terminal device.

The local service providing means may be adapted to retrieve the set of parameters in response to the receipt of a setup request for a default bearer from the MME.

According to a second aspect, the gateway device may comprise a gateway (e.g. HNB gateway) provided at a local access device, the gateway being used as an intermediate node for connecting a plurality of local access devices. In the second aspect, the local service providing means may be adapted to retrieve the set of parameters in response to the receipt of a setup request for a default bearer from a serving gateway device (e.g. S-GW) of the core network.

The above second aspect provides the advantage that even a standard serving gateway device (e.g. S-GW) can be used without modifications at the core network, in case the local service providing means are placed into or at the gateway.

According to a third aspect, the apparatus may be provided at or in an access device (e.g. a home access device such as a HNB) arranged to provide access to the core network.

According to a first option of the third aspect, the local service providing means may be adapted to retrieve the set of parameters in response to the receipt of a setup request for a default bearer from a serving gateway device of the core network.

According to a second option of the third aspect, the local service providing means may be adapted to retrieve the set of parameters and to trigger a paging procedure for a terminal device, in response to the receipt of at least one downlink data packet which lacks at least one of interface context and bearer service. In a more specific example, the local service providing means may be adapted to trigger the paging procedure by sending the at least one received data packet via a predetermined user plane interface to the gateway device. This predetermined interface may be an S5-U interface of a GPRS or UMTS core network, for example.

According to a third option of the third aspect, the local service providing means may be adapted to retrieve the set of parameters and to initiate a managed remote access to a home based network for a terminal device, in response to the receipt of a setup request for a default bearer from a serving gateway device of the core network.

According to a fourth option of the third aspect, the local service providing means may be adapted to retrieve the set of parameters and to initiate an outbound handover for a terminal device, in response to the result of a handover decision at the access device. In a more specific example, the local service providing means may be adapted to update the set of parameters and to set up a user plane tunnel to the serving gateway device of the core network, in response to the receipt of a user plane update request from the serving gateway device.

According to the second to fourth option of the third aspect, the interface (e.g. S1_MME) to the mobility management function (e.g. MME) of the core network is combined with a control-plane and user-plane interface (e.g. S5-C and S5-U) supporting paging and managed remote access, to thereby provide a less complex approach for handling local gateway functions and the co-located local gateway can be fully omitted. The proposed control-plane and user-plane interface (e.g. S5-C and S5-U) termination in the access device (e.g. HNB) from the serving gateway (e.g. S-GW) provides a less inferior solution for local IP access than the conventional solution of terminating the control plane interface (e.g. S11) from the mobility management function (e.g. MME) of the core network.

The proposed local service providing means in the access device is thus beneficial in that it provides a solution for paging support for terminal devices using local IP access services (i.e. allows using idle mode with local IP access services) without any modifications in the existing control-plane interfaces. Now the very same serving gateway of the core network can be used both for ordinary bearer services, local IP access Services and managed remote access services.

Other advantageous modifications are defined in the dependent claims.

BRIEF DESCRIPTION OF THE DRAWINGS

The invention will now be described in greater detail based on embodiments with reference to the accompanying drawings in which.

DESCRIPTION OF THE EMBODIMENTS

In the following, embodiments of the present invention will be described based on an exemplary and non-limiting LTE network architecture.

Figure 1:
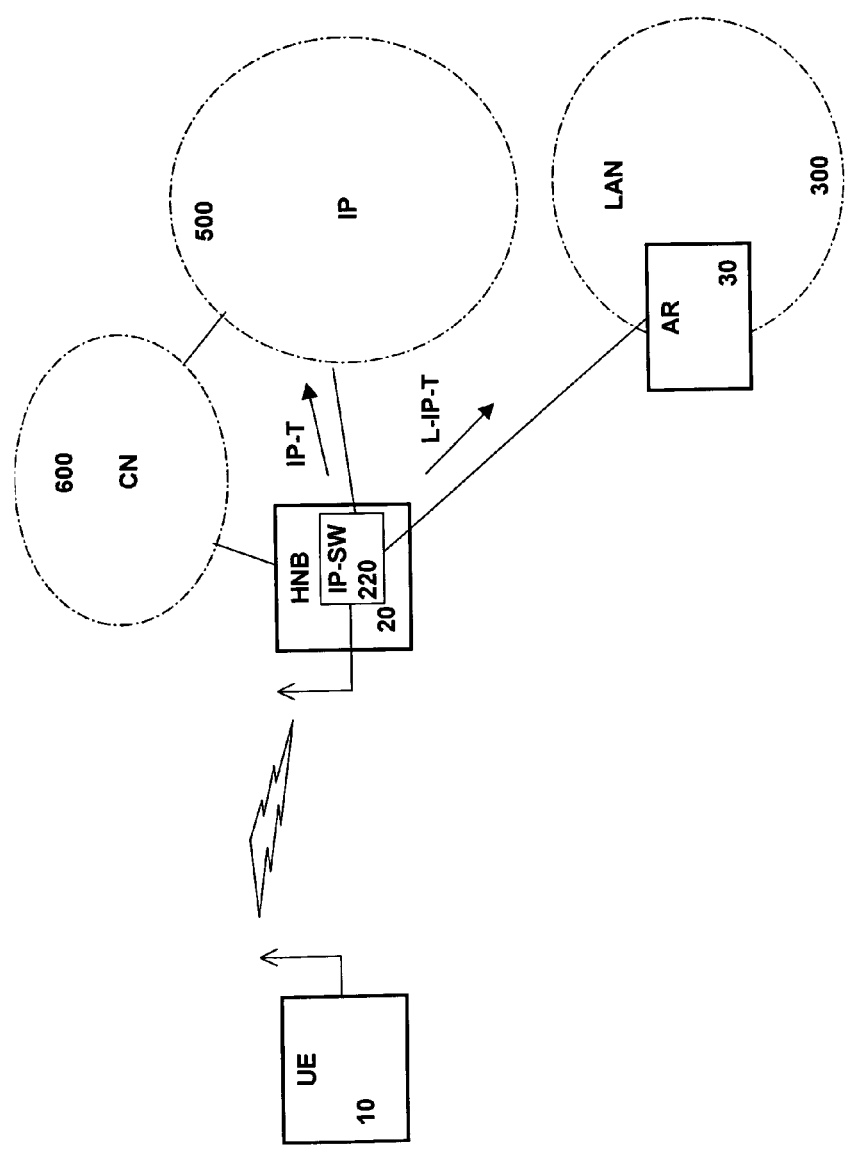
FIG. 1 shows a schematic network architecture with a HNB involving a link layer switching functionality.

FIG. 1 shows a schematic network architecture comprising at least one HNB 20 with added virtual gateway functionality in a subscriber home environment, e.g. within a building, and connected to an operator's core network (CN) 600, an IP network 500 and a home based LAN 300 with an access router (AR) 30. The HNB 20 comprises an IP switch (IP-SW) 220 for switching IP traffic directly to the IP network 500 or the LAN 300 without involvement of the CN 600. The IP switch 220 thus serves to provide the virtual gateway functionality for LBO of local IP traffic (L-IP-T) and other IP traffic (IP-T). The IP traffic may originate from or terminate at a UE 10 which is wirelessly connected to the HNB 20 via an air interface.

The HNB 20 which serves the UE 10 comprises an interface towards the LAN 300 and the IP network 500, which provides a termination point for the UE 10 from the LAN 300 and the IP network 500.

Thus, instead of implementing a full IP router functionality in the HNB 20 for local IP access (or LBO) services—like it would be in case of conventional gateway solutions—, the gateway functionality at the HNB 20 can be simplified to operate as a switching or bridging function for user IP traffic between the LAN 300 (home based network) or the IP network 500 and an UE specific point-to-point link over the radio interface (bearer service). The switching or bridging functionality may be an IP aware functionality which means that this functionality provided by the IP switch 220 can behave as a "UE proxy" towards the LAN 300 or the IP network 500, so that it serves not only to assist the UE 10 in assigning an IP address and support neighbour discovery functions, but also to enable performing link layer mobility transparently to the UE 10 and eliminating the need for using some IP mobility mechanisms in the local IP access service area.

According to the Open Systems Interconnection Reference Model (OSI Model), network architectures are divided into seven layers which, from top to bottom, are designated application, presentation, session, transport, network, link (or data-link), and physical layer. A layer can be regarded as a collection of conceptually similar functions that provide services to the layer above it and receives services from the layer below it. For example, a layer that provides error-free communication across a network provides the path needed by applications above it, while it cause the next lower layer to send and receive packets that make up the contents of the path.

In the present embodiments, link layer (also referred to as "L2") and network layer (also referred to as "L3") levels are distinguished. The network layer provides the functional and procedural means of transferring variable length data sequences from a source to a destination via one or more networks, while maintaining the quality of service requested by the transport layer. The network layer performs network routing functions, and might also perform fragmentation and reassembly, and report delivery errors. Routers operate at this layer—sending data through the extended network and making the Internet possible. A well-known example of a network layer protocol or L3 protocol is the Internet Protocol (IP). It manages the connectionless transfer of data one hop at a time, from end system to ingress router, router to router, and from egress router to destination and system. It is not responsible for reliable delivery to a next hop, but only for the detection of erroneous packets so that they may be discarded or corrected. When the medium of the next hop cannot accept a packet in its current length, IP is responsible for fragmenting the packet into sufficiently small packets which a medium can accept.

The (data) link layer (L2) provides functional and procedural means to transfer data between network entities and to detect and possibly correct errors that may occur in the physical layer (also referred to as "L1").

The proposed IP switch 220 may be provided in a user plane interface of the HNB 20 and could be implemented as link layer device (e.g. L2 switch) from the point of view of the LAN 300 and the IP network 500. This means that from the viewpoint of the UE 10 or the HNB 20, its local IP point of attachment is located in the external next hop router seen from the HNB 20. In the LAN 300, as a home or local area network (office, campus etc.), this next hop router may be a default gateway to external networks, provided e.g. in a separate digital subscriber line (DSL) router box. Or, in case of the IP network 500 it may be the nearest IP router in the Internet service provider (ISP) network.

In case an IP aware bridging or switching function is realized in the IP switch 220, the HNB 20 can perform IP lookup in order to forward user downlink traffic to a corresponding UE specific bearer service (i.e. point-to-point link) over the radio interface. Another alternative for implementing the IP aware bridging or switching function could be to model the IP switch 220 as a wireless L2 switch. In this case, the forwarding decision for user local IP traffic from the LAN 300 or the IP network 500 to the corresponding UE specific bearer service can be done based on UE specific link layer addresses (e.g. Ethernet MAC addresses).

The suggested IP switch 220 in the HNB 20 thus provides the advantage that there is no need to run an IP routing protocol, to perform router advertisements or the like. In the uplink direction the HNB 20 simply forwards the local IP access traffic directly to its network interface in the LAN 300 or the IP network 500 and does not require any tunneling protocol or other IP tunneling.

The advantage of the proposed HNB 20 with IP switch 220 can be recognized from local IP access service with IP session continuation support between multiple HNBs or other kinds of base stations connected with the same local area without necessitating any mobility agent node (e.g. home agent in proxy mobile IP) in the LAN 300 or the IP network 500.

Figure 2:
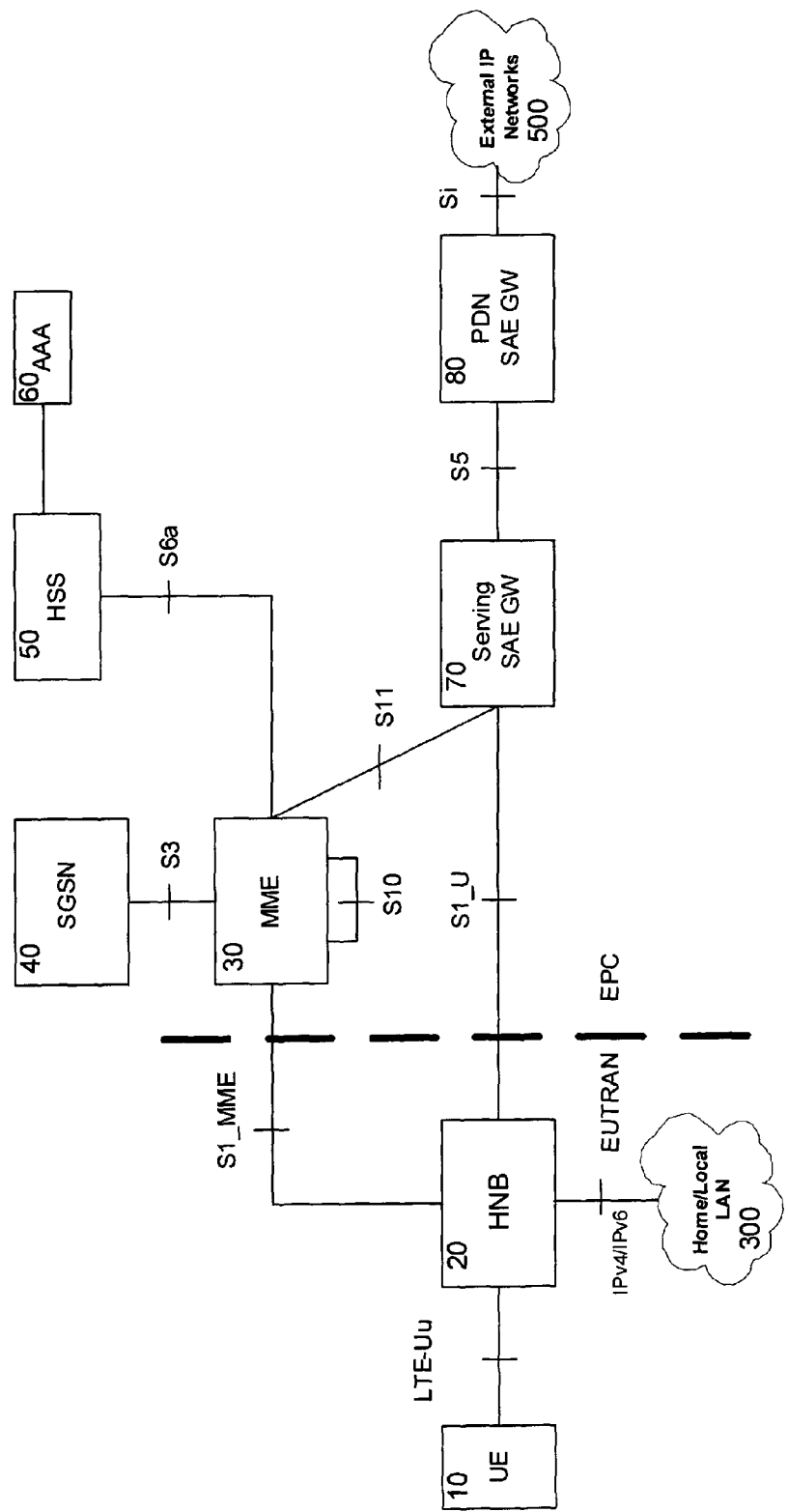
FIG. 2 shows a more detailed architecture of the network system with involved network elements.

FIG. 2 shows a more detailed block diagram of network entities involved in a local IP access or LBO procedure and corresponding interfaces between those network entities. The exemplary network architecture of FIG. 2 is based on an EUTRAN system as described for example in the 3GPP specification TS23.401 V8.4.0.

LBO of IP traffic via a visited public land mobile network (PLMN) is supported, when network policies and user subscription allow it. LBO may be combined with support for multiple simultaneous packet data network (PDN) connections. The bold dashed line in FIG. 2 separates the EUTRAN part of the network system from the evolved packet core (EPC) of the network system. A UE 10 is connected via a LTE-Uu interface to a HNB 20. The HNB 20 is connected via a IPv4/IPv6 interface to a Home/Local LAN 300. Additionally, the HNB 20 is connected via a S1-MME interface to at least one MME 30 of the EPC. This S1-MME interface forms a reference point for the control plane protocol between the EUTRAN and the MME. The MME 30 is connected via a S3 interface to a Serving General Packet Radio Services (GPRS) Support node (SGSN) 40. The S3 interface enables user and bearer information exchange for inter 3GPP access network mobility in idle and/or active state. Furthermore, the MME 30 is connected via a S6a interface to a Home Subscriber Server (HSS) 50 in which subscriber data are stored. The S6a interface enables transfer of subscription and authentication data for authenticating/authorizing user access to the evolved system between the MME 30 and the HSS 50. The HSS 50 is also connected to an authentication, authorization, and accounting (AAA) server 60 which manages fundamental system access functions.

As additional entities, the EPC comprises a serving System Architecture Evolution (SAE) gateway (S-GW) 70 and a PDN SAE gateway (P-GW) 80 which provide a gateway function to external IP networks 500. The S-GW 70 is connected via a S11 interface to the MME 30, wherein the S11 interface provides a reference point between the MME 30 and the S-GW 70. Additionally, the S-GW 70 is connected via a S1_U interface to the HNB 20, wherein the S1-U interface provides a reference point between the EUTRAN and the S-GW 70 for the per bearer user plane tunneling and inter-HNB path switching during handover.

At the MME 30, a S10 interface provides a reference point between MMEs for MME relocation and MME to MME information transfer. The S-GW 70 and P-GW 80 are connected via a S5 interface which provides user plane tunneling and tunnel management between these gateways. It can be used for S-GW relocation due to UE mobility and if the S-GW 70 needs to connect to a non-co-located PDN gateway for the required PDN connectivity. It is noted that the P-GW 80 and the S-GW 70 may be implemented in one physical node or separate physical nodes. The S-GW 70 is the gateway which terminates the interface towards the EUTRAN. For each UE associated with the EPS, at a given point of time, there may be a single S-GW as a local mobility anchor point for inter-HNB handover, responsible for packet routing, forwarding and lots of other gateway functions. The P-GW 80 is the gateway which terminates the interface towards the PDN, e.g., the external IP network 500. The PDN may be any operator external public or private packet data network or an intra-operator packet data network, e.g. for provision of IP multimedia subsystem (IMS) services. If the UE 10 is accessing multiple PDNs, there may be more than one P-GW for that UE 10.

According to the following embodiments, a simple local IP access APN (access point name) service can be placed as a service providing functionality, function, unit or means to the EPC, that emulates to the MME/SGSN the functions of the S-/P-GW (or GGSN) in order to provide the required configuration (e.g. set of parameters) by using ordinary elementary procedures over the S11 and S5 Interfaces (or Gn for 3G). Thus, core network interfaces (like Gn, Gx, S5 or S11) do not have to be terminated in the HNB for controlling the co-located local GGSN or local S/-PGW in the HNB/HeNB.

This local IP access APN service could run in any place where it can be accessed over IP from the MME for example:
In a real S-/P-GW
In an MME as a "local host"
In a HNB gateway
In a simple PC
In a HNB In this way the standard MME does not need to be modified as it executes the related S11 elementary procedures as usual. This would be the case if the MME would use the already existing S-GW for that user. However, then, the local IP access APN-Service would have to be provided at each S-GW. If there was e.g. a central or internal service, the MME would additionally need to always use a pre-defined address for the S11 interface for LBO APNs.

The proposed local IP access APN service emulates control-plane functions of the S-/P-GW but it does not need to support any user-plane processing functions, as in the local IP access (or LBO) this will happen via the local virtual gateway function in the HNB. As explained above, this virtual gateway function performs simple IP traffic bridging between the local area network and the EPS bearer service over the radio interface.

The pre-provisioned local IP access service parameters retrieved and returned from the local IP access APN service function to the MME e.g. in an S11 Default Bearer Setup Response message could be e.g. the following:

| Parameter | Remark, Used for | Need for HNB |
|---|---|---|
| PDN Type | IPv4, IPv6 or IPv4v6 of the local bearer | UE requested value in "Address Allocation Preference" could be used, or a pre-provisioned value in the Local IP Access Server. Note! Local area network configuration and policies will overrule this if value is not correct. |
| PDN Address | UE address | Could be set to 0.0.0.0 in order to indicate that UE is mandated to use DHCP or IPv6 Address Auto-configuration over Local IP Access Bearer Service. |
| Serving GW address for User Plane | GTP tunnel | Not needed (don't care) in HNB for Local IP Access Service without tunnelling. The value could be set to 0.0.0.0 in order to indicate no S1-U tunnelling needed. |
| Serving GW TEID for User Plane | GTP tunnel | Not needed (don't care) in HNB for Local IP Access without tunnelling. The value zero could be set to indicate no S1-U tunnelling needed. |
| Serving GW TEID for control plane | For S11 | Not needed in "virtual" local S-GW in HNB for Local IP Access. For MME allocate unique value in the LBO APN Server |
| EPS Bearer Identity | | (H)NB receives all the required bearer parameters in the S1 E-RAB Setup Request to serve Local IP Access. Use MME allocated value in the LBO APN Server |
| PDN GW addresses and TEIDs (GTP-based S5/S8) or GRE keys (PMIP-based S5/S8) at the PDN GW(s) for uplink traffic | For HO with SGW change | Not needed locally in HNB as no local S-GW relocation will be visible to the EPC. MME given HNB IP Address and zero values for TEIDs could be returned from the LBO APN Server |
| Protocol Configuration Options | These are transparent to the MME and S-GW | |
| Address Allocation Preference | Normally returns PDN GW preferred value IPv4, IPv6 or IPv4v6 e.g. DHCPv4 for IPv4 address allocation can be forced by value IPv4 combined with 0.0.0.0 value in the UE address IE | The LBO APN Server returns the UE requested value in "Address Allocation Preference" or a pre-provisioned value in the LBO APN Server |
| PPP support (PAP/CHAP) | | Set to value "PPP not used" |
| IMS related info | P-CSCF Address IM CN Subsystem Signaling Flag DNS Server Address Policy Control | Not needed for simple Local IP Access service in HNB (don't care). Use any proper values e.g. zero IP addresses. |

| Parameter | Remark, Used for | Need for HNB |
|---|---|---|
| Charging Id | rejection code Selected Bearer Control Mode (BCM) | Except if the local DNS server Address is pre-provisioned, it could be included Not needed (don't care) in HNB for Local IP Access. No charging records generated for flat rate. Create any proper value in the LBO APN Server |
| Prohibit Payload Compression | | Not needed (don't care) in HNB for Local IP Access. Set to "Prohibit Payload Compression" in the LBO APN Server |
| APN Restriction | Max APN restr. | Not needed in HNB (don't care). Set pre-provisioned value for in the LBO APN Server |
| Cause | | |
| CGI/SAI/RAI change report required | Location reports | Not needed in HNB (don't care), nomadic mobility in home cell Set to "Not Required" in the LBO APN Server |
| APN-AMBR | Indicates maximum bit rates for uplink and downlink | Set to pre-provisioned value in the LBO APN Server. |

Figure 3:
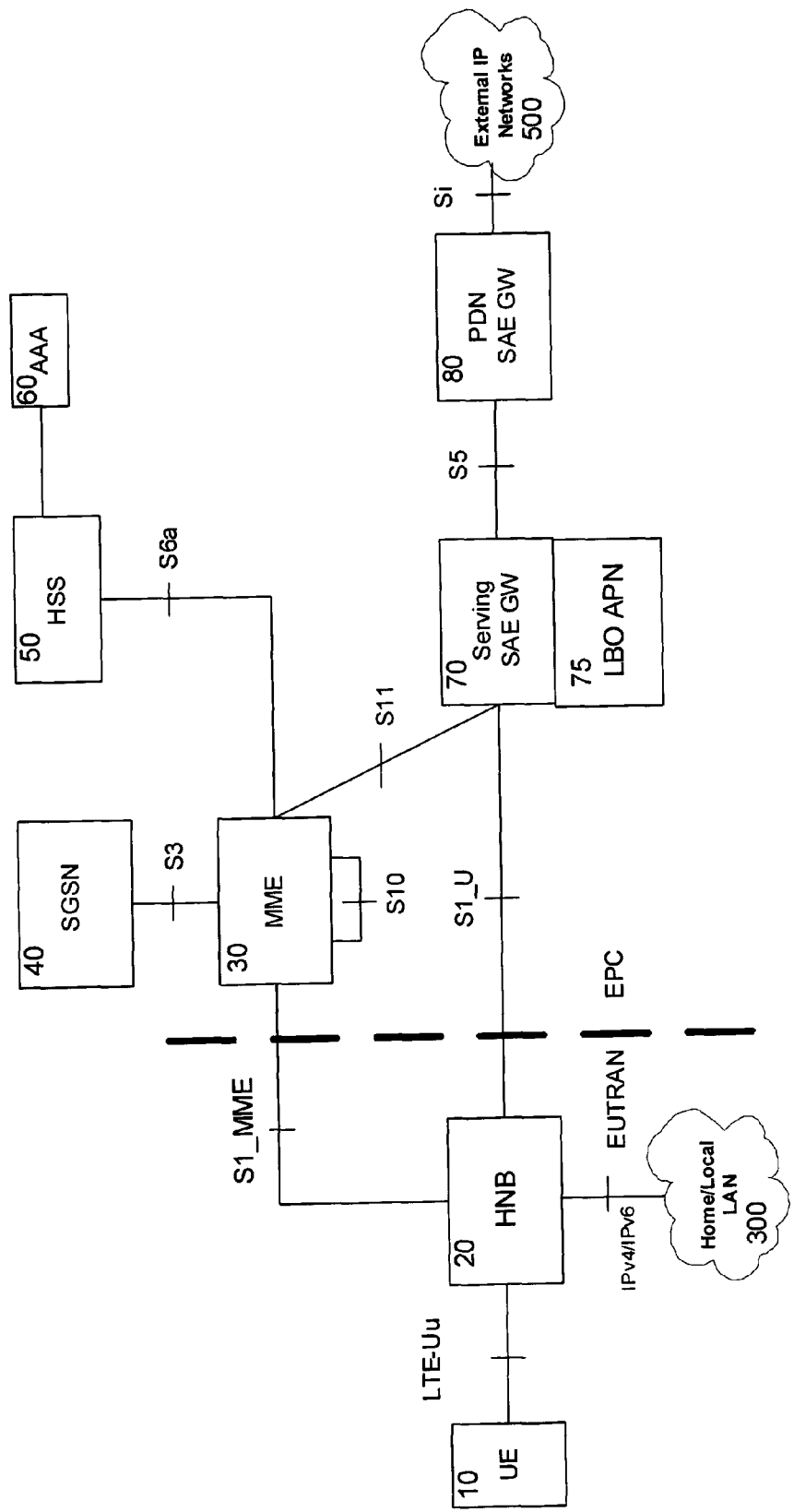
FIG. 3 shows a more detailed architecture of the network system with involved network elements according to a first embodiment.

FIG. 3 shows a more detailed architecture of the network system with involved network elements according to a first embodiment.

In the first embodiment, the local IP access APN service function 75 has been placed in or at the same S-GW node 70 (or P-GW node) that provides the user plane mobility anchor point to the UE 10 in the EPC. In this way the requirement for a single S-GW per UE can be met, i.e., the UE specific S11 elementary procedures can terminate in the same endpoint both for the ordinary EPS bearer services and the local IP access services.

The S-GW 70 can trigger the selection of the local IP access APN service 75 based on the APN itself (e.g. special APNs for LBO), or the MME 30 may set certain individual or unique S11 message parameters for LBO specifically.

The pre-provisioned set of parameters in the local IP access APN service 75 can be common for all HNBs supporting local IP access service and also for those users having local IP access service subscription.

Figure 4:
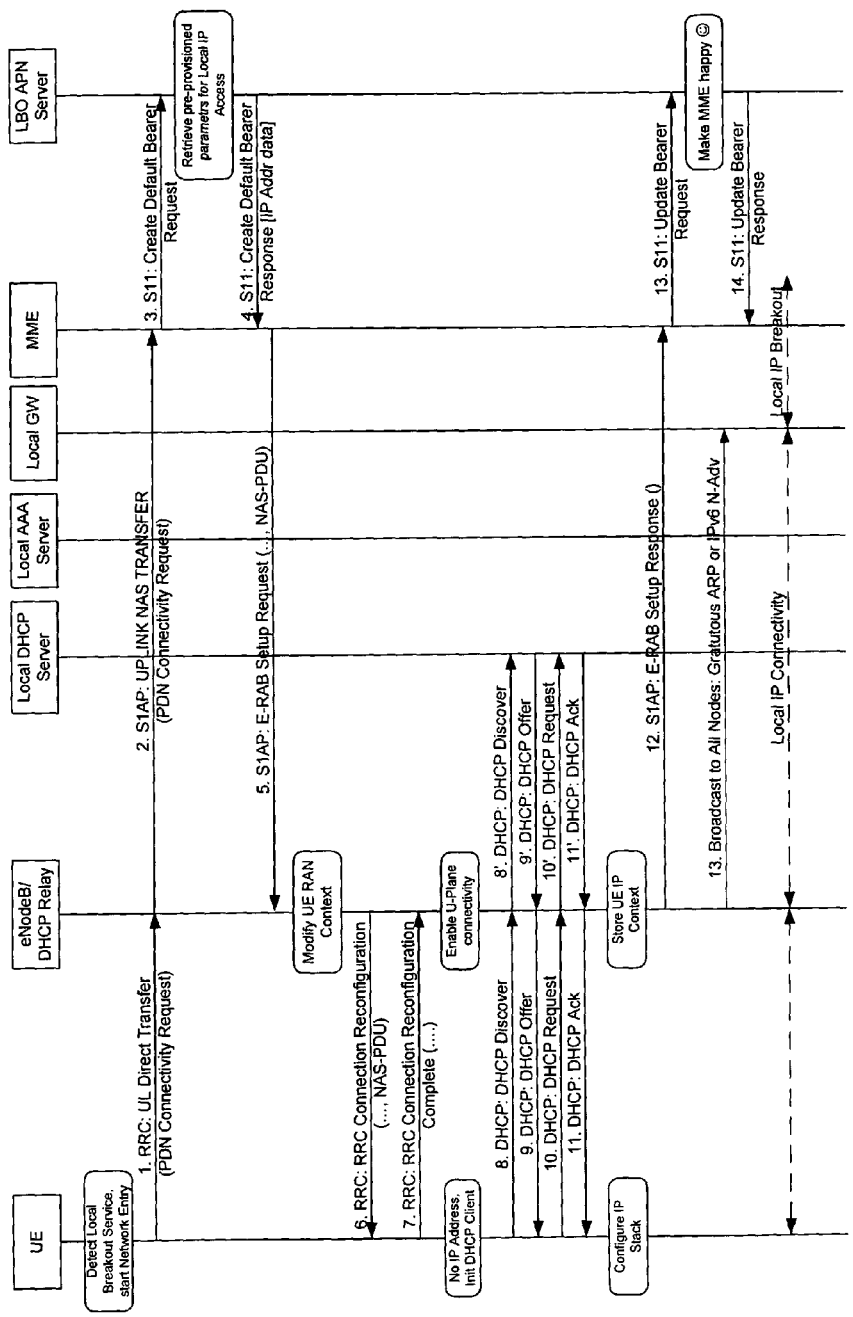
FIG. 4 shows a signalling and processing diagram for a local IP access setup processing in the first embodiment.

FIG. 4 shows a signalling and processing diagram which indicates messages and processing in connection with a UE requested PDN connectivity procedure for local IP access or LBO setup in the first embodiment.

As can be gathered from FIG. 4, when the UE 10 detects an LBO service e.g. based on a corresponding broadcast information, it starts network entry by sending a PDN connectivity request via an RRC direct transfer in uplink (UL) direction to the HNB 20 (step 1) which can act as a DHCP relay. The HNB 20 forwards the received connectivity request via the S1 interface as an uplink NAS transfer to the MME 30 (step 2). Then, the MME 30 issues a Create Default Bearer Request via the S11 interface to the S-GW 70 with its local IP access APN service 75 (step 3). The local IP access APN service detects the desired LBO, retrieves the pre-provisioned set of parameters for local IP access, and adds them to a Create Default Bearer Response message returned to the MME 30 in step 4. An empty IP address field may thus be forwarded from the core network. Based on the received parameters, the MME 30 generates and sends an E-RAB Setup request with a NAS-PDU to the HNB 20 (step 5).

The HNB 20 modifies the UE RAN context accordingly and sends in step 6 an RRC Connection Reconfiguration message with the received NAS-PDU to the UE 10. The UE may setup an EPS bearer and an APN mapped to the LBO service. The UE 10 responds with an RRC Connection Reconfiguration Complete message (step 7).

If the connection reconfiguration message from the HNB 20 does not contain any IP address for the UE 10, the UE 10 initiates an address configuration procedure at a DHCP client. To achieve this, a DHCP Discover message is sent in steps 8 and 8' via the HNB 20 to a local DHCP server (not shown in FIG. 3), which responds with a DHCP Offer message in steps 9 and 9' forwarded to the UE 10 via the HNB 20. Based on the suggested IP address, the UE 10 sends a DHCP Request in steps 10 and 10' via the HNB 20 to the local DHCP server which acknowledges the requested address in steps 11 and 11'. Based on the result of the DHCP address configuration procedure, the UE 10 configures its IP stack and the HNB 20 stores the IP context of the UE 10. Of course, other address configuration procedures, such as IPv6 address auto-configuration or the like could be used as well.

The HNB 20 now forwards in step 12 a E-RAB Setup Response message to the MME 30 and broadcasts in step 13 to all nodes a notification or request with the own IP address allocated to the UE 10 as a target address in order to check whether this IP address is used more than one time and/or to update tables or stacks in other nodes. This notification may be a gratuitous Address Resolution Protocol (ARP) request packet, wherein "gratuitous" in this case means a request/reply that is not normally needed according to the ARP specification but could be used in some cases. As an alternative, a corresponding IPv6-N-adv (Neighbor Advertisement) message could be sent.

Additionally, in step 13 and a further step 14 the MME 30 and the local IP access (or LBO) APN service 75 may execute an S11 update bearer request upon reception of S1 bearer setup response in the MME 30. Normally this procedure is used for the S-GW 70 to start delivery of its buffered DL packets. However, as there will not be any user plane processing in the EPC, this is more or less a "dummy procedure" in order to avoid any changes in the implementation of the MME 30.

Figure 5:
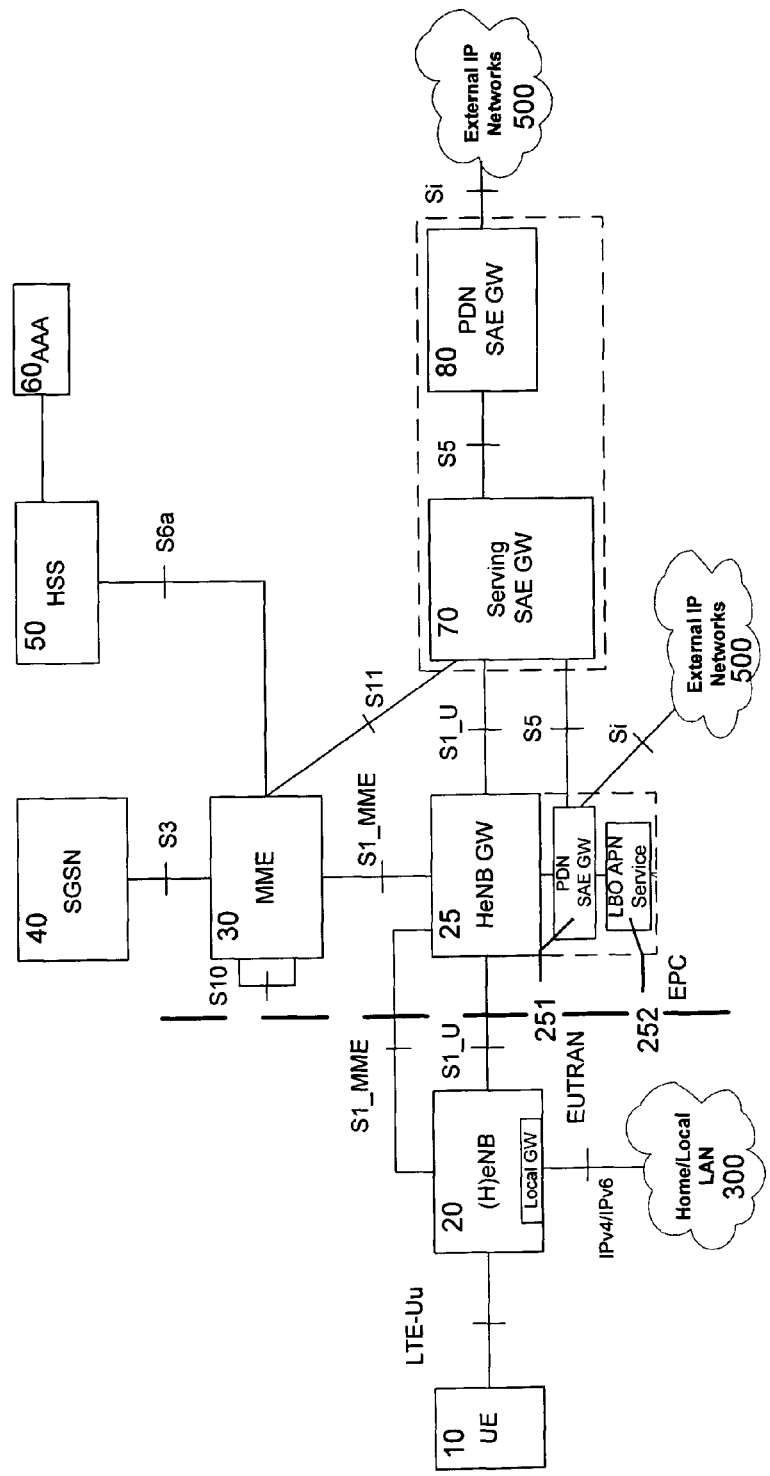
FIG. 5 shows a more detailed architecture of the network system with involved network elements according to a second embodiment.

FIG. 5 shows a more detailed architecture of the network system with involved network elements according to a second embodiment. Here, a local IP access APN service 252 is placed into a HNB GW 25 which is used as an intermediated node to connect numerous HNBs to the EPC.

In this second embodiment also, the S-GW 70 does not need any modifications, as the standard S5 interface can be used between the S-GW 70 and the co-located local IP access APN service 252 in the HNB GW 25.

In case LBO shall be supported optionally at the HNB GW level, then a co-located P-GW function 251 could be implemented there and controlled over the same S5 interface as the local IP access APN service 252 supporting LBO directly from HNB 20. In the MME 30 the standard P-GW selection procedure can be used and the HNB-GW address can be derived from the LBO-APN.

The local IP access APN service 252 and the P-GW function 251 in the HNB GW 25 could be implemented either as co-located functions (integrated into HNB GW 25) or as co-sited functions (i.e. separate node(s) placed at the same site).

Figure 6:
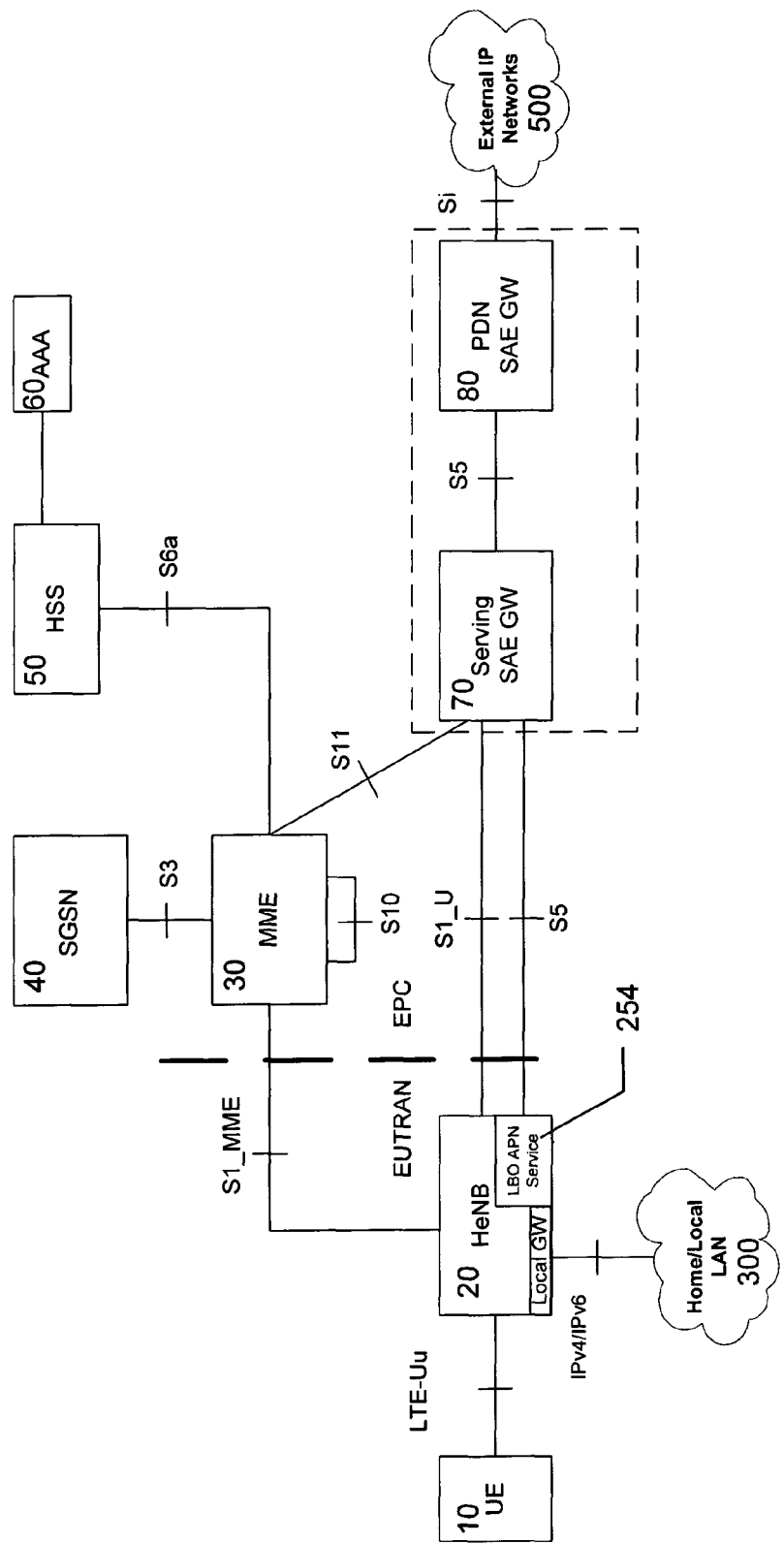
FIG. 6 shows a more detailed architecture of the network system with involved network elements according to a third embodiment.

FIG. 6 shows a more detailed architecture of the network system with involved network elements according to a third embodiment. Here, a local IP access APN service 254 is placed into the HNB 20 itself.

Thus, the S5 control-plane interface termination in the HNB 20 from the S-GW 70 provides a less inferior solution for local IP access or LBO. The Stream Control Transmission Protocol (SCTP) based S1_MME interface can be kept as the only control-plane interface between the HNB 20 and the MME 30 (physically separate nodes), so that the MME 30 can be kept as it is.

Furthermore, the S1-U and the S5 interfaces are GTP based interfaces and terminate in the same physical S-GW 70. This enables combination of these two interfaces based on the fact that the GTP protocol supports both user and control plane handling.

Only "PDN GW like" local gateway function is required in the HNB 20 for assisting with the protocol configuration option (PCO) parameters to be passed via the MME 30 (e.g. parameters that are not generated in the MME 30 normally). The S5-C interface is the PDN-GW control Interface from the S-GW 70.

In addition, the third embodiment provides the advantage that UEs which do not have an own DHCP client can be supported for local IP access.

Furthermore, the S-GW role in the EPC is minor in the GTP variant and can be kept as a single user plane anchor for an UE in the EPC. There is no need for introducing a local S-GW function in the HNB 20.

Also various mobility management issues become easier. E.g., there is no need for additional S-GW relocations due to UE movements between HNBs and macro eNBs. The S5 like interface over S1-U can be used for providing remote access from a macro network to the home based network via the local "PDN" GW in the HNB 20.

Figure 7:
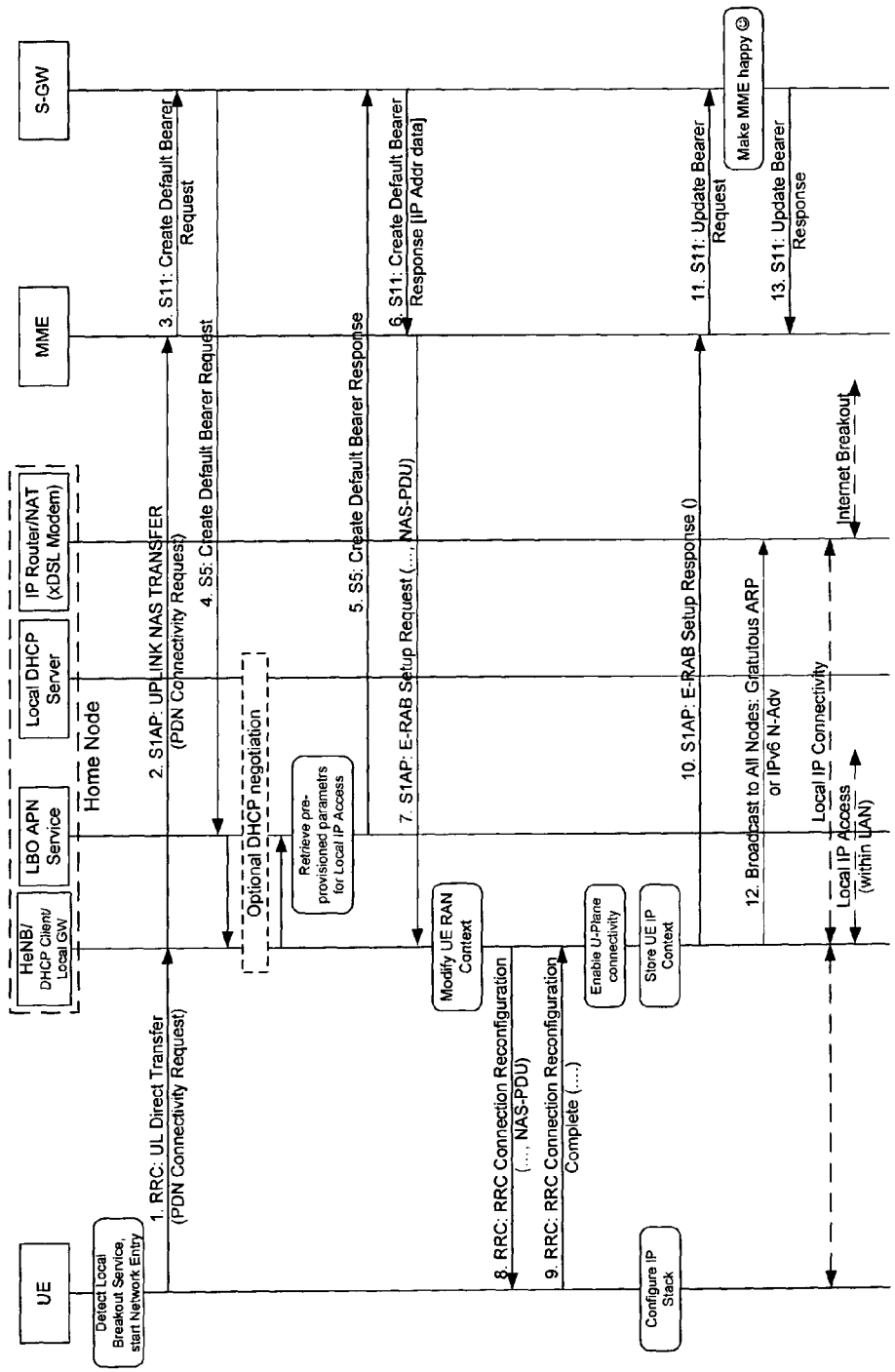
FIG. 7 shows a signalling and processing diagram for a local IP access setup processing in the third embodiment.

FIG. 7 shows a signalling and processing diagram for a local IP access setup processing in the third embodiment. More specifically, a requested PDN connectivity procedure for local IP access setup is shown, where the local IP access APN service 254 provided in or at the HNB 20 can be accessed over a combined S1-U/S5-C interface.

The detailed signaling flow of FIG. 7 illustrates how the UE 10 without DHCP client capability can be supported to obtain an IP address for a desired local IP access service using the proposed co-located local IP access APN service 254 in the HNB 20.

For reasons of brevity, only specific new steps of the third embodiment are described now. As to the remaining steps it is referred to FIG. 4 and/or the corresponding standard documents mentioned above.

When the MME 30 receives from the HNB 20 in step 2 the Uplink NAS Transfer message via the S1 interface, it generates a Create Default Bearer request and forwards it in step 3 to the S-GW 70 which relays it in step 4 via the S5 interface to the local IP access APN service 254 at the HNB 20. A single S-GW 70 can be provided in the EPC for all services. After an optional DHCP negotiation at the HNB 20 (to support UEs without DHCP client), the local IP access APN service 254 retrieves the pre-provisioned set of parameters for local IP access and forwards it in step 5 in a Create Default Bearer response via the S5 interface to the S-GW 70.

An advantage of providing the local IP access APN service in the EPC is that it enables to use the standard MME 30 without any modifications for supporting local IP access services (i.e. local IP breakout) directly via the HNBs to local area networks.

Figure 8:
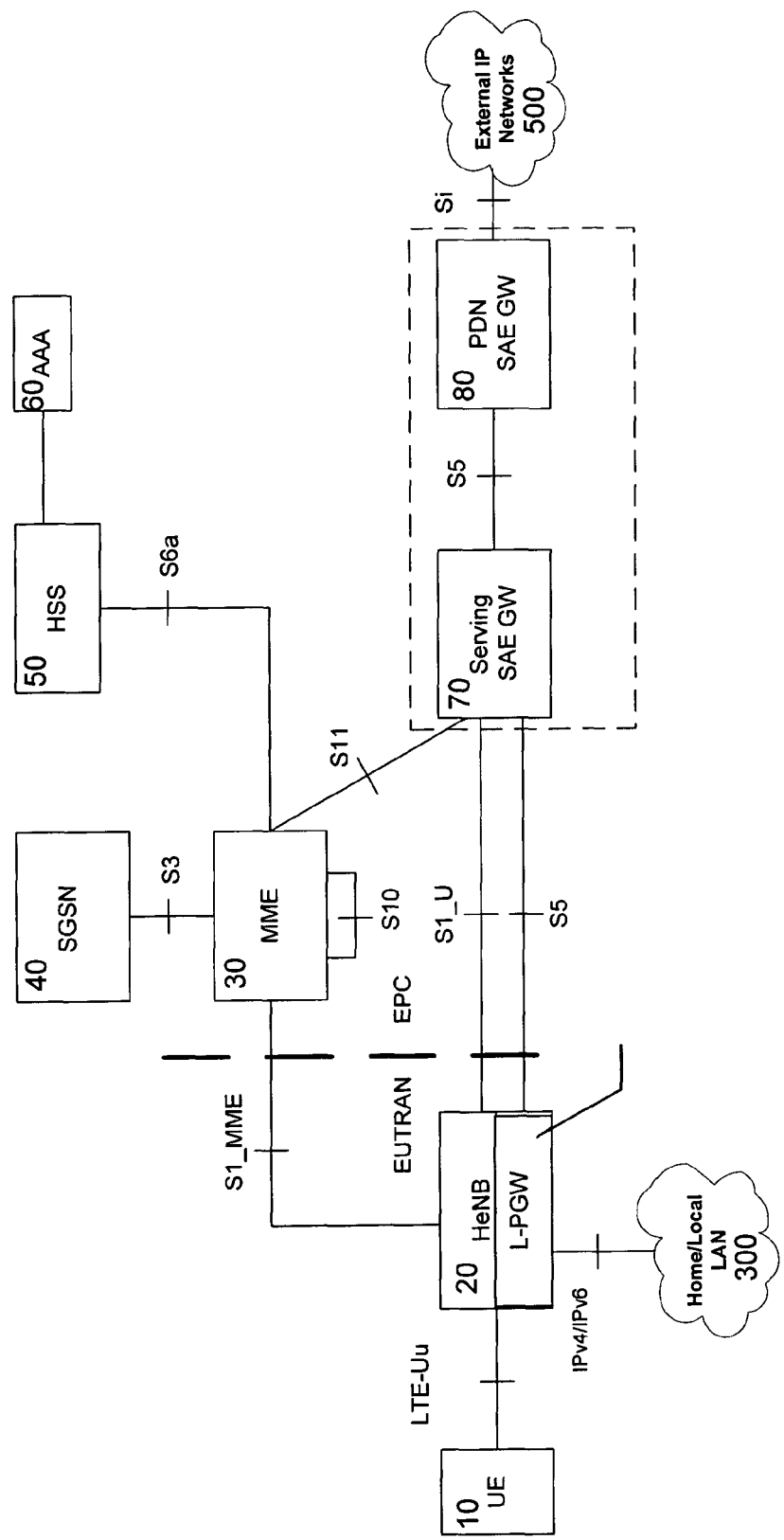
FIG. 8 shows a more detailed architecture of the network system with involved network elements according to a fourth embodiment.

FIG. 8 shows a more detailed architecture of the network system with involved network elements according to a fourth embodiment.

In the fourth embodiment, the S1_MME interface is combined with a S5 like control-plane and an S5 like user plane interface which support paging and managed remote access to provide a less complex approach with a local P-GW (L-PGW) functionality 256 for handling local P-GW functions e.g. by using the above local IP access APN service. The co-located local S-GW functions can be omitted entirely.

The S5 like control-plane and user-plane interface termination in the HNB 20 from the S-GW 70 provides a less inferior solution for local IP access than the conventional termination of the S11 interface from the MME 30.

Besides the advantages mentioned in connection with the third embodiment, the fourth embodiment is arranged so that the S5-U like interface can be used for providing managed remote access from a macro network to a home based network via the local P-GW function 256 in the HNB 20.

Furthermore, the S5-U like interface can be used to trigger UE paging in the S-GW 70 upon reception of downlink (DL) traffic for local IP access service in the latest serving HNB with local P-GW functionality 256. Home devices can thus access the UE 10 with its local IP address independently of the current location of the UE 10, i.e., whether it is connected to its HNB 20, or to any macro eNB.

Figure 9:
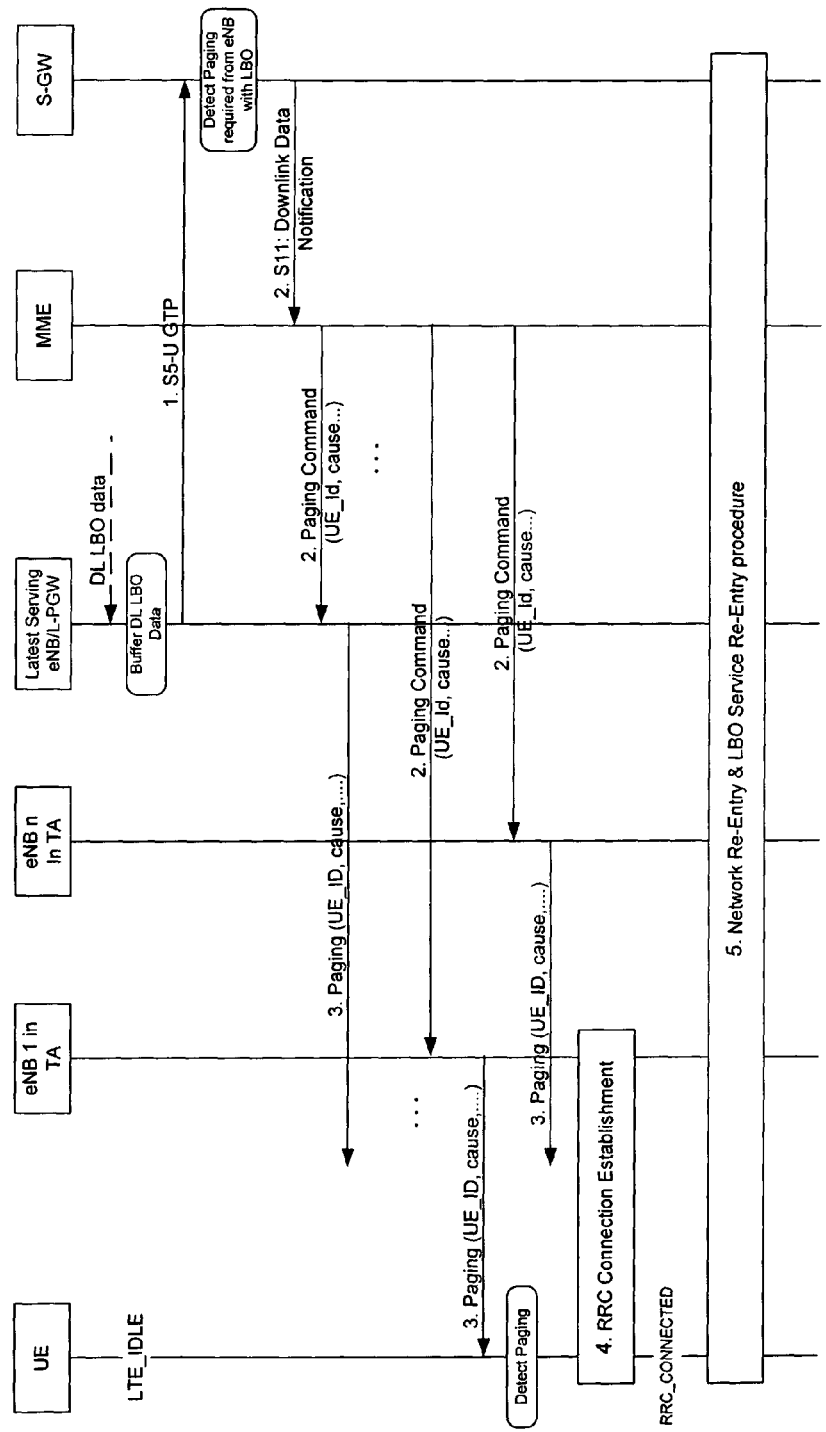
FIG. 9 shows a signalling and processing diagram for a paging processing in the fourth embodiment.

FIG. 9 shows a signalling and processing diagram for a paging processing in the fourth embodiment. More specifically, it is shown how the paging procedure for an UE in idle mode and having activated local IP access service can be triggered simply by sending a DL data packet from the HNB 20 with its local P-GW functionality 256 to the S-GW 70 in the EPC over the S5-U interface.

According to FIG. 9, DL LBO data is received at the latest serving eNB or HNB and buffered in a corresponding buffer for downlink LBO data for an UE that has been moved to an idle state where even the radio bearer(s) and S1 related context data have been released.

The tunnel endpoint identifier (TEIDs) and tunnel endpoint addresses used for the S1-U interface could be stored and used for the remaining "S5-U connection" between the S-GW 70 and HNB 20. Another alternative would be to create a S5-U tunnel in the local IP access service setup even if it will not pass any traffic while the UE is in active mode.

The context service provided by the local P-GW functionality 256 which remains alive is analogous to the P-GW context data and S5 connection in the EPC that will remain alive regardless of any active-to-idle state transitions at the UE 10. Thus, the local P-GW functionality 256 in UE idle mode is analogous to the P-GW 80 in the EPC, i.e., it can pass the received DL packets to the S-GW 70 via the S5-U interface. In the HNB 20 the UE idle mode and need for sending packet to the S-GW 70 over the S5-U interface can be differentiated explicitly based on e.g. the missing S1 context and EPS bearer services over the radio interface.

It should be noted that the actual DL data buffering for Local IP Access service can happen in the HNB 20, as traffic is normally not routed via any EPC element. It is sufficient to send just one (e.g. the very first) DL packet over the S5-U interface to the S-GW 70 in step 1 to trigger the paging. Other alternative mechanisms could be to send a "dummy IP packet" destined to the UE's IP Address, or a GTP-C message "Paging Needed".

The S-GW 70 is normally in charge of buffering DL traffic and sends a "Downlink Data Notification" in step 2 to the MME 30 which further delivers (still in step 2) a paging command to all HNBs or eNBs in a tracking area where the UE 10 has the latest registration. This solution works on the reception of an S5-U datagram from the HNB 20 as well. Again, the S-GW 70 in the EPC can detect that the UE 10 is in its idle state based on the missing S1 context data.

The HNBs in the target area issue corresponding pagings with UE identification and cause parameters in step 3 to their served UEs. If the targeted UE detects the paging, it initiates an RRC connection establishment in step 4. Then it changes its mode from the idle mode to a connected mode (e.g. "RRC_CONNECTED") and initiates a network re-entry and LBO service re-entry procedure in step 5.

Figure 10:
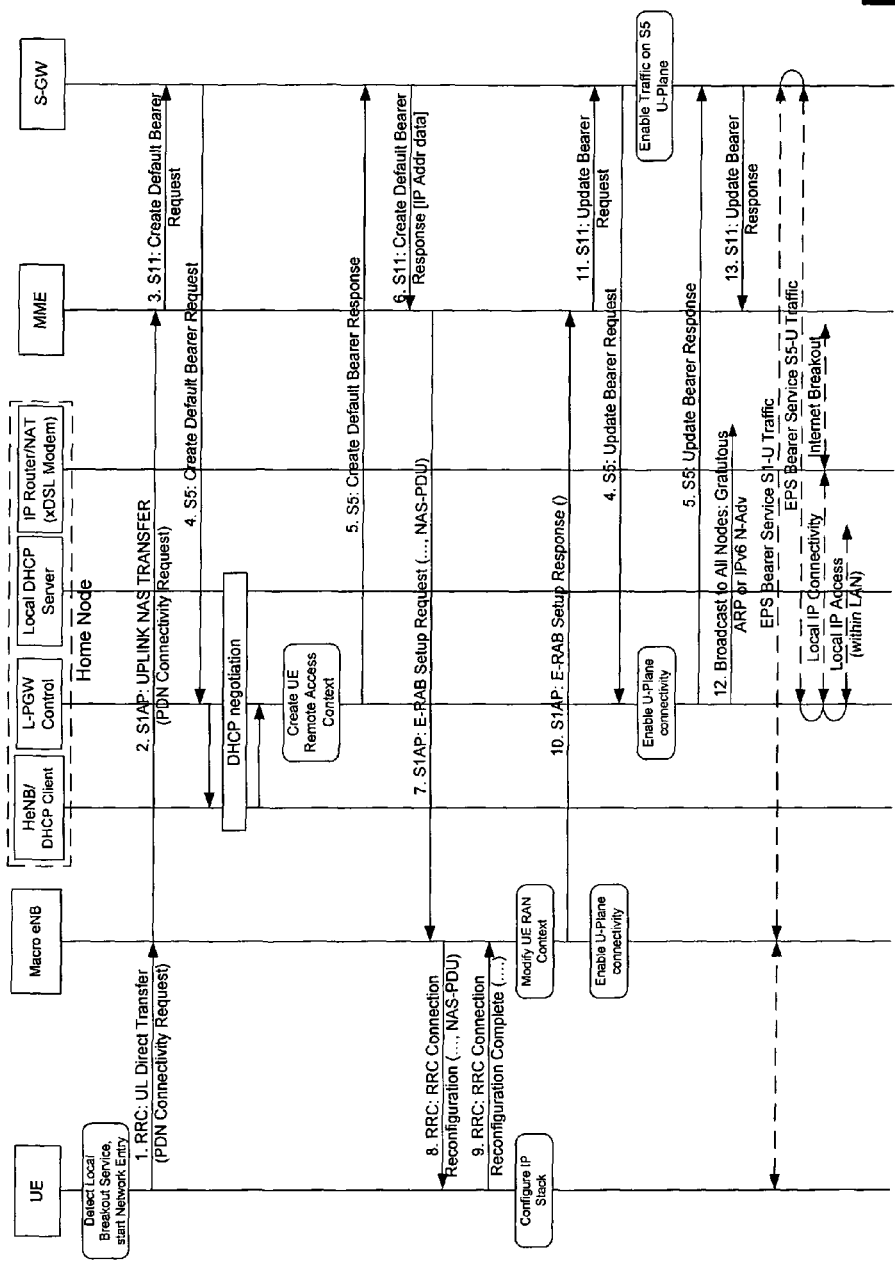
FIG. 10 shows a signalling and processing diagram for a managed remote access processing in the fourth embodiment.

FIG. 10 shows a signalling and processing diagram for a managed remote access processing in the fourth embodiment.

The detailed signaling flow in FIG. 10 illustrates how the managed remote access to home based network can be initialized using the co-located local P-GW functionality 256 in or at the HNB 20 and controlling it over the "S5 like" interface. Here, "S5 like" interface means that only a subset of ordinary P-GW functions is needed for supporting local IP access or managed remote access to home based network features in the HNBs.

In the case of the managed remote access feature the local P-GW functionality 256 is a natural breakpoint to the home LAN using the "S5 like" interface from the single S-GW 70 per UE in the EPC. The remote access service setup may work according to the standard UE Requested PDN Connectivity procedure defined in the 3GPP specification TS 24.301. A detailed description of the steps of FIG. 10 is therefore omitted for reasons of brevity.

When a macro eNB in a macro cell receives a PDN connectivity request in step 1 from the UE 10, it forwards the connectivity request based on an uplink (UL) NAS transfer to the MME 30. The MME 30 issues in step 3 a Create Default Bearer request to the S-GW 70 which forwards it via the "S5 like" interface to the local P-GW functionality 256 at the HNB 20. After an optional DHCP negotiation (in the event that the concerned UE has no DHCP client), the local P-GW functionality 256 retrieves a predefined set of parameters and creates a remote access context for the UE 10. This context is then returned to the S-GW 70 in a Create Default Bearer response (step 5) and then to the MME 30 (step 6), and so on.

Now the access to home based network can work seamlessly from any macro cell remotely or locally when the UE 10 is connected to the HNB 20. In the latter case the GTP tunneled S1-U and S5-U interfaces can be omitted due to local breakout from the HNB 20, i.e., only EPS bearer service for local IP access is required over the radio interface and the local P-GW functionality 256.

It should be noted that the very same S-GW 70 is in use all the time for ordinary EPS services consumed from the core network in parallel.

It should also be noted that when a managed remote access service is established to a home based network, IP devices connected to the home based network can initiate an IP connection to the UE 10 as well, as if it were connected to the home based network directly via the HNB 20 using the local IP access service.

Other IP hosts can access the UE 10 using the managed remote access service, even if the UE 10 has been moved to its idle state in the macro network. The previous paging procedure described in connection with FIG. 9 works for the managed remote access service as well. Now the S-GW 70 could receive multiple data packets from the local IP host via the local P-GW functionality 256 i.e., DL packet buffering is needed as usual. As already mentioned, a single DL packet is enough to trigger paging in the local IP access case.

Figure 11:
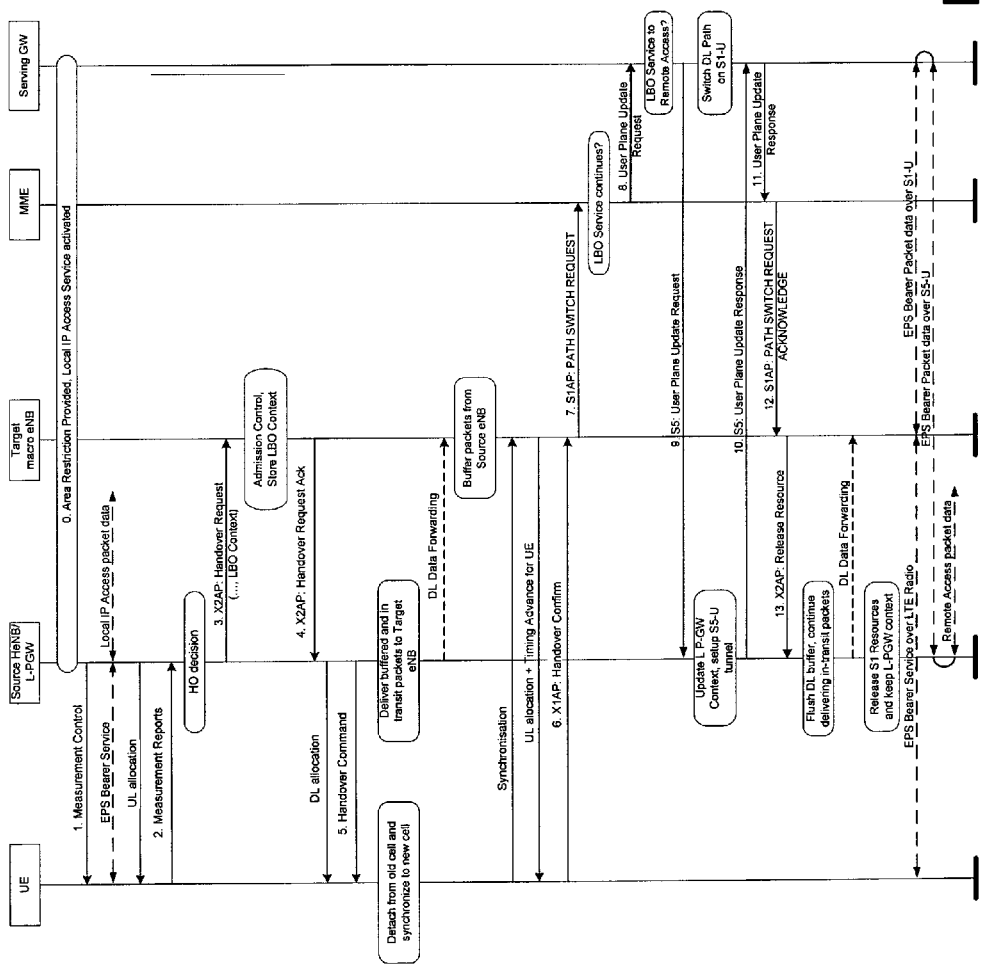
FIG. 11 shows a signalling and processing diagram for an outbound handover processing with switching to managed remote access in the fourth embodiment.

FIG. 11 shows a signalling and processing diagram for an outbound handover processing with switchover from local IP access to managed remote access in the fourth embodiment. More specifically, FIG. 11 illustrates an outbound handover from the HNB 20 to a macro eNB when UE's ongoing local IP access service is autonomously switched over to a managed remote access service to a home based network. Again, only those steps related to the embodiment are described in detail.

Normally, when an UE using local IP access service moves out of coverage of a serving HNB, its IP session would be interrupted and would break, as user traffic which uses a local IP address is not routable behind the default gateway out of the home based network (e.g. Intranet). In FIG. 11 the network shall establish automatically a remote connection to the HNB 20 with local P-GW functionality 256 over the S5-U Interface (i.e. GTP-tunneled) to the S-GW 70 serving the UE 10 in the EPC.

The EPS bearer configuration data for local IP access service shall be moved besides other UE RAN context data to the target macro eNB in a handover request (step 3). This context transfer works both in X2 based inter-eNB handover directly between the source HNB and the target macro eNB, and in S1 based inter-eNB handover when handover control data is passed via the MME 30. FIG. 11 only illustrates the former X2 based handover case.

The target macro eNB is assumed to know based on its configuration data that it does not provide direct connectivity to the home based network which was available in the source HNB. This could be identified in the target eNB e.g. based on CSG (Closed Subscriber Group) network identity (ID) or a local service area ID which is associated with the local IP access bearer service.

Now the target eNB prepares to switch over the local IP access bearer service to an ordinary GTP-tunneled EPS bearer service over the S1-U interface to the S-GW 70 in the EPC. The target eNB can create the required GTP-tunnel parameters (e.g. TEID value) and delivers it to the MME 30 in a path switching message transmitted over the S1AP interface (step 7 in FIG. 11).

The MME 30 is assumed to be aware of the ongoing local IP access service for this UE (as the MME 30 is in charge of session management) and also detects movement out of local IP access service area. Now, the MME 30 makes a decision to switch the local IP access Service over to a managed remote access service via the local P-GW functionality 256 in the source HNB 20. Then, in step 8, the MME 30 adds to a user plane update request via the S11 interface all the required APN, address and configuration information, so that S-GW 70 is able to setup the S5 interface (both control and user plane) by forwarding a user plane update request message to the local P-GW functionality 256 in the HNB 20 (step 9).

It is assumed that the HNB 20 keeps the local P-GW context alive upon reception of this user plane update request over the S5-C interface and configures the S5-U interface to the S-GW 70 accordingly (step 10). Even the radio resources and S1 context data (or UE RAN context) will be released after the inter eNB handover is completed.

From now on the UE 10 is able to continue access to the home based network via the local P-GW functionality 256 using EPS bearer service where user traffic traverses the radio interface between the UE 10 and the macro eNB to the S-GW 70 over the S1-U interface and finally to the local P-GW functionality 256 over the S5-U interface, from which it breaks out to the home network.

Hence, the optimized S5 based and co-located local P-GW functionality 256 in the HNB 20 provides a solution for paging support for UEs using local IP access services (i.e. it allows using idle mode with local IP access services) without any modifications in the existing control-plane interfaces according to the pertinent 3GPP Release 8 specifications. This also solves the problem of multiple serving gateways allocated to an UE in the EPC. Now, the very same S-GW 70 in the EPC can be used for ordinary EPS bearer services, local IP access services and managed remote access services.

Figure 12:
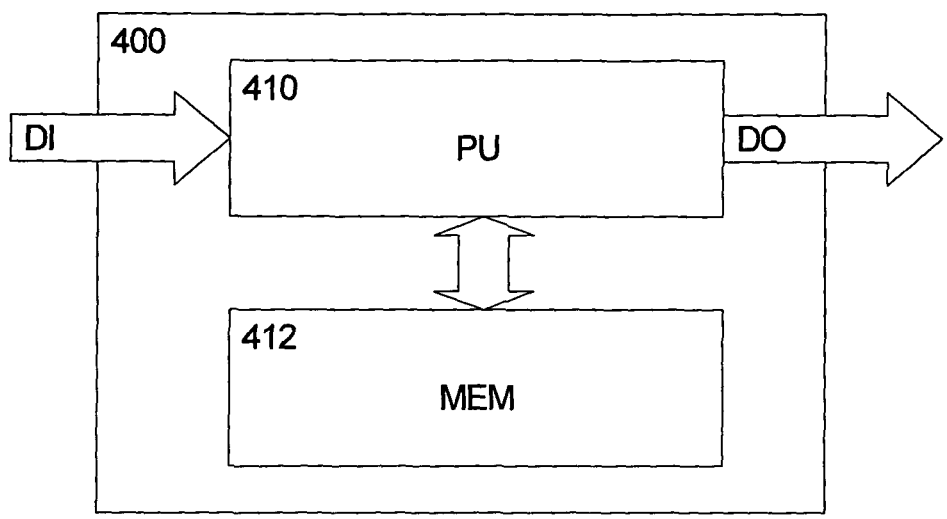
FIG. 12 shows a schematic block diagram of a software based implementation according to fifth embodiment.

FIG. 12 shows a schematic block diagram of an alternative software-based implementation according to another embodiment. The required functionality can be implemented in any base station type network entity 400 with a processing unit 410, which may be any processor or computing device with a control unit which performs control based on software routines of a control program stored in a memory 412. The control program may also be stored separately on a computer readable medium. Program code instructions are fetched from the memory 412 and are loaded to a control unit of the processing unit 410 in order to perform the processing steps of the device-specific functionalities described in connection with FIGS. 3 to 8, which may be implemented as the above mentioned software routines. The processing steps may be performed on the basis of input data DI and may generate output data DO. In case of the processing performed at the proposed service providing means (e.g. local IP access APN service or local P-GW functionality), the input data DI may correspond to a signalling received via the specific control interface and the output data DO may correspond to the individual signalling which initiates the resulting LBO specific procedure.

Consequently, the functionalities of the above embodiments of service providing means may be implemented as a respective computer program product comprising code means for generating each individual step of the processing and/or signalling procedures for the respective entities or functions when run on a computer device or data processor of the respective entity.

In summary the present invention relates to a method, an apparatus, and a computer program product for providing access via a cellular access network to a packet network, wherein control plane functions of a gateway device of a core network are emulated to the core network, and the emulated control plane functions are used to provide to the core network a set of parameters for local breakout.

It is apparent that the invention can easily be extended to any network environment where an access device of a radio access network is connected to a core network having a mobility management entity or a similar entity and corresponding gateway functionalities for providing access to other PDN networks. The invention is not intended to be restricted to the specific messages explained in connection with FIGS. 4, 5, 7, and 9 to 11 but can be extended to any corresponding messages having the same or similar functionalities. In addition, the invention is not limited to the described interfaces and can be extended to any interface between an access device of a radio access network and a mobility management entity or gateway entity or similar entities of a core network.

The invention claimed is:

1. An access network device capable of providing wireless connectivity to terminal devices, the access network device comprising a co-located local gateway node for emulating, to a core network, control plane functions of a gateway device of said core network, and for providing to said core network a set of parameters for local breakout, in order that the core network accepts the control plane functions and related control messages as being under the control of a core network entity when instead they are under the control of the co-located local gateway node of the apparatus.

2. The access network device according to claim 1, wherein said gateway device is a gate-way support node of a General Packet Radio Services network, a serving System Architecture Evolution gateway, or a packet data network System Architecture Evolution gateway.

3. The access network device according to claim 1, wherein said co-located local gateway node is adapted to use ordinary elementary procedures over at least one control interface of said core network.

4. The access network device according to claim 3, wherein said at least one control inter-face comprises at least one of an S5 interface, an S11 interface and a Gn interface of a General Packet Radio Services or Universal Mobile Telecommunications System core network.

5. The access network device according to claim 1, wherein said set of parameters comprises at least one of a packet data network type requested by a terminal device requesting said local breakout, a packet data network address of said terminal device, a serving gateway ad-dress, a serving gateway tunnel endpoint identifier for a user plane, a serving gateway tunnel endpoint identifier for a control plane, a bearer identity for said local breakout, at least one packet data network gateway address and tunnel endpoint identifier or generic routing encapsulation key for uplink traffic, an address allocation preference, a prohibit payload compression parameter, and an aggregate maximum bitrate for local breakout bearers.

6. A gateway device comprising an apparatus according to claim 1, wherein said gateway device is arranged to provide access from said core network to an external network for said local breakout.

7. The gateway device according to claim 6, wherein said gateway device comprises a serving System Architecture Evolution gateway.

8. The gateway device according to claim 7, wherein said co-located local gateway node is adapted to retrieve said set of parameters in response to the receipt of a setup request for a default bearer from a management mobility entity.

9. The gateway device according to claim 6, wherein said gateway device is a gateway provided for a local access device, said gateway being used as an intermediate node for connecting a plurality of local access devices.

10. The gateway device according to claim 9, wherein said co-located local gateway node is adapted to retrieve said set of parameters in response to the receipt of a setup request for a default bearer from a serving gateway device of said core network.

11. The access network device according to claim 1, wherein said access network device is arranged to provide access to said core network.

12. The access network device according to claim 1, wherein said access device comprises a home access device.

13. The access network device according to claim 11, wherein said co-located local gateway node is adapted to retrieve said set of parameters in response to the receipt of a setup request for a default bearer from a serving gateway device of said core network.

14. The access network device according to claim 1, wherein said co-located local gateway node is adapted to retrieve said set of parameters and to trigger a paging procedure for a terminal device, in response to the receipt of at least one downlink data packet which lacks at least one of interface context and bearer service.

15. The access network device according to claim 14, wherein co-located local gateway node is adapted to trigger said paging procedure by sending said at least one received data packet via a predetermined user plane interface to said gateway device.

16. The access network device according to claim 15, wherein said predetermined inter-face is an S5-U interface of a General Packet Radio Services or Universal Mobile Telecommunications System core network.

17. The access network device according to claim 1, wherein said co-located local gateway node is adapted to retrieve said set of parameters and to initiate a managed remote access to a home based network for a terminal device, in response to the receipt of a setup request for a default bearer from a serving gateway device of said core network.

18. The access network device according to claim 1, wherein said co-located local gateway node is adapted to retrieve said set of parameters and to initiate an outbound handover for a terminal device, in response to the result of a handover decision at said access device.

19. The access network device according to claim 18, wherein said co-located local gateway node is adapted to update said set of parameters and to set up a user plane tunnel to a serving gateway device of said core network, in response to the receipt of a user plane update request from said serving gateway device.

20. A method, performed by an access network device, the method comprising:
  emulating, to a core network, control plane functions of a gateway device of said core network in order that the core network accepts the emulated control plane functions and related control messages as being under the control of a core network entity when instead they are under the control of a co-located local gateway node; and
  using said emulated control plane functions to provide to said core network a set of parameters for local breakout.

21. A computer program, embodied on a non-transitory computer readable medium, the computer program comprising code means for producing, when run on a computing device, the steps of an access network device:
  emulating, to a core network, control plane functions of a gateway device of said core network in order that the core network accepts the emulated control plane functions and related control messages as being under the control of a core network entity when instead they are under the control of a local gateway node co-located with an access network device; and
  using said emulated control plane functions to provide to said core network a set of parameters for local breakout.

* * * * *